US012768939B2

(12) United States Patent
Gilliot et al.

(10) Patent No.: US 12,768,939 B2
(45) Date of Patent: Oct. 20, 2026

(54) TARGET CHARACTERISATION METHOD FOR A DETECTION DEVICE OF MULTI-PANEL RADAR OR SONAR TYPE WITH ELECTRONIC SCANNING

(71) Applicant: THALES, Meudon (FR)

(72) Inventors: Adrien Gilliot, Merignac (FR); Vincent Corretja, Merignac (FR); Stephane Kemkemian, Elancourt (FR); Nicolas Leger, Merignac (FR)

(73) Assignee: THALES, Meudon (FR)

( * ) Notice: Subject to any disclaimer, the term of this patent is extended or adjusted under 35 U.S.C. 154(b) by 266 days.

(21) Appl. No.: 18/542,168

(22) Filed: Dec. 15, 2023

(65) Prior Publication Data

US 2024/0201322 A1 Jun. 20, 2024

(30) Foreign Application Priority Data

Dec. 16, 2022 (FR) ...................................... 2213554

(51) Int. Cl.

| | |
|---|---|
| ***G01S 7/295*** | (2006.01) |
| ***G01S 7/41*** | (2006.01) |
| ***G01S 7/53*** | (2006.01) |
| ***G01S 7/539*** | (2006.01) |
| ***G01S 13/42*** | (2006.01) |
| ***G01S 13/89*** | (2006.01) |

(Continued)

(52) U.S. Cl.

CPC ............... *G01S 7/295* (2013.01); *G01S 7/411* (2013.01); *G01S 7/53* (2013.01); *G01S 7/539* (2013.01); *G01S 13/428* (2013.01); *G01S 13/89* (2013.01); *G01S 15/42* (2013.01); *G01S 15/89* (2013.01)

(58) Field of Classification Search

CPC . G01S 7/295; G01S 7/411; G01S 7/53; G01S 7/539; G01S 13/428; G01S 13/89; G01S 15/42; G01S 15/89

See application file for complete search history.

(56) References Cited

U.S. PATENT DOCUMENTS

| | | | |
|---|---|---|---|
| 6,362,774 | B1 | 3/2002 | Green |
| 2011/0215962 | A1 | 9/2011 | Culkin |

(Continued)

OTHER PUBLICATIONS

Foreign Communication from a Related Counterpart Application, French Search Report dated Jun. 7, 2023, French Application No. 2213554 filed on Dec. 16, 2022.

*Primary Examiner* — Nazra Nur Waheed
(74) *Attorney, Agent, or Firm* — Conley Rose, P.C.

(57) ABSTRACT

The invention relates to a target characterisation method for a detection device of multi-panel radar or sonar type with electronic scanning, comprising the steps of:

generating a plurality of pulses on a plurality of antenna panels (PE1, PE2, PE3) of the detection device according to a temporal and angular interleaving pattern, so as to perform a scan over all of the relative bearing domain of the detection device;

generating a plurality of detection maps, by the acquisition of a plurality of observations combined with one another by coherent or non-coherent integration of the echoes corresponding to the plurality of pulses, each detection map being obtained in a given direction (EL1, EL2, EL3) corresponding to the width of the main lobe of the antenna panel;

combining the detection maps so as to detect a presence of a target in the relative bearing domain of the detection device.

7 Claims, 5 Drawing Sheets

(51) Int. Cl.
*G01S 15/42* (2006.01)
*G01S 15/89* (2006.01)

(56) References Cited

U.S. PATENT DOCUMENTS

| | | | | |
|---|---|---|---|---|
| 2015/0061916 | A1 | 3/2015 | Sinclair | |
| 2017/0285158 | A1* | 10/2017 | Halbert | G01S 7/414 |
| 2018/0136344 | A1* | 5/2018 | Nelson | G01T 1/20181 |
| 2019/0101639 | A1* | 4/2019 | Rincon | H01Q 21/065 |
| 2019/0265353 | A1* | 8/2019 | Jones | G01S 13/32 |

* cited by examiner

TARGET CHARACTERISATION METHOD FOR A DETECTION DEVICE OF MULTI-PANEL RADAR OR SONAR TYPE WITH ELECTRONIC SCANNING

CROSS-REFERENCE TO RELATED APPLICATIONS

The present application claims priority to French Application No. 2213554 filed with the Intellectual Property Office of France on Dec. 16, 2022, which is incorporated herein by reference in its entirety for all purposes.

TECHNICAL FIELD

The invention relates to a target characterisation method for a detection device of multi-panel radar or sonar type with electronic scanning. It is applicable to any set of antenna arrays (each set forming a "panel") provided with the capacity to phase-shift the signal applied to each of the antennas or each of the subgroups of antennas forming the array, in order to modify the antenna pattern ("electronic scanning"). The systems affected by the invention are notably radars and sonars comprising panels with phase control.

The design of detection modes (a mode is composed of a waveform to be transmitted, of a listening time during which the array digitises the received signals, and a set of processing operations applied to the received signals in order to decide—or not—on the presence of a target) is an active research field, particularly in complex environments.

The complex environments are characterised notably by the presence of ground echoes in the received signal (ground/ground, air/ground or air/air modes when the system is looking downwards), by the presence of sea echoes in the received signal, or, more generally, by the presence of any real echo (i.e. one that is not thermal noise), that is powerful, and/or distributed statistically according to a complex law.

One method that assists in detecting targets consists in estimating the Doppler shift undergone by the waveform transmitted: the ground and sea echoes exhibit a Doppler shift that is of low amplitude, and predictable. For example, in order to dispense with sea clutter in the detection of the targets, it is known practice to combine two observations of the same zone, spaced apart in time by approximately one second. This delay corresponds to the sea clutter correlation time. Any powerful echo exhibiting a Doppler shift that is much greater or much less than those provided for the ground and the sea will be able to be considered as originating from a target.

When generating the waveform, the designer is faced with a set of constraints posed by the hardware capabilities of the detection system (radar/sonar) as well as by the scanning pattern used, limiting the possible choices concerning the waveforms. One of the constraints, well-known to the person skilled in the art, is illustrated by FIG. 1.

The left-hand part of FIG. 1 represents the temporal sequence of $N_{Dop}$ transmitted pulses. Each dot symbolises a pulse, that is to say a waveform of duration $L_i \ll T_R$. After reflection on a remote object, a sequence of $N_{Dop}$ received pulses is recovered with the period $T_R$. The Fourier transform of these $N_{Dop}$ pulses makes it possible to obtain a frequency spectrum, a realisation of which is presented in the right-hand part of FIG. 1. This spectrum comprises $N_{Dop}$ points (since calculated over $N_{Dop}$ pulses), and has the unambiguous spectral width $F_a = F_R$, in application of the sampling theory.

In the right-hand part of FIG. 1, a peak can be seen around 200 Hz which corresponds to the ground clutter. Upon the detection of a target, if the Doppler echo of the target is situated in the peak, it will be difficult to detect the echo, because, in this case, it is necessary for the echo from the target to be more powerful than the ground echoes. On the other hand, a target echo outside of the peak can easily be detected. Outside of the peak, the frequency spectrum corresponds to the thermal noise. Thus, at the boundary between the two zones, false alarm regulation is complicated. Noises of very different natures (sea or ground clutter, or thermal noise) may be mixed at the middle of the peak (at 200 Hz in FIG. 1). The fact that the peak is offset in frequency and is spread out or narrowed down from one firing to another, complicates the regulation of the false alarm at the boundary. Indeed, from one firing to another on a "boundary" frequency cell, there will therefore sometimes be pure thermal noise, sometimes very powerful sea clutter. The canonic algorithm which chooses the threshold to be applied on each frequency cell is disturbed by this "all or nothing", and chooses a medium-high threshold, which therefore generates a false alarm when the peak is offset on the cell concerned.

The coherent modes of the prior art (see in particular the article entitled "Radars Traitements avancés du signal radar" (Radars Advanced radar signal processing operations) J. Darricau, Techniques de l'ingénieur) that are based on known scanning methods, canonically exhibit the following properties:

$$F_a = F_r \tag{1}$$

$$D_a \propto \frac{c_0}{2F_r} \tag{2}$$

The ambiguous frequency $F_a$ of the integrated sequence of pulses is equal to the frequency of repetition $F_r$ of these pulses, and the ambiguous distance $D_a$ is inversely proportional to $F_r$, with $c_0$ the speed of propagation of the pulse in its environment. In the prior art, $F_a$ and $D_a$ are therefore linked by an inverse proportionality relationship, limiting the coherent mode design possibilities.

FIG. 2 illustrates the constraint of the relationship (2). The left-hand part represents the two phases of operation of a pulse radar/sonar: transmission of duration Li and reception of duration $T_R - L_i$.

The right-hand part illustrates the consequence of this mode of operation: without distance ambiguity elimination processing, the instrumented domain is given by the disc contained between the circles C1 and C2. The circle C1 corresponds to the instrumented minimum distance $D_{min}$ around the detection device 1 and the circle C2 corresponds to the instrumented maximum distance $D_{max}$ ($=D_a$). The radius of the circle C2 is given to within a factor by the constraint (2).

In the prior art, reducing the spectral width $F_a$ necessarily leads to increasing the instrumented domain $D_a$. Given the roundness of the Earth, it is impossible to observe a target of given altitude beyond a certain distance represented in FIG. 2 by the circle C3 corresponding to the horizon line. The enlargement of $D_a$ beyond this horizon is therefore reflected by an unnecessarily great listening time $T_R - L_i$, which represents time lost during which no new useful information is acquired.

The scanning method described in the patent application WO 2013/149828 A1 uses a mechanical scanning antenna to scan the environment with a speed of rotation of 60°/s. The antenna also has electronic scanning capabilities for two predefined angles with respect to the line of sight of the mechanical scanning (β30° and +30°). The radar thus revisits each zone of interest after a short time period (approximately one second). This "look-back mode" capability allows the natural decorrelation of the sea clutter to take place between the initial and retrospective samples of the surveillance zone.

Thus, the scanning method described in the patent application WO 2013/149828 A1 makes it possible to create modes subject to the constraint $F_a<F_R$ in the case of a radar/sonar system provided with a single electronic scanning panel, mounted on a mechanical positioner. This scanning method is not however compatible with an objective of quasi-instantaneous 360° coverage, because of its single-panel design (a typical electronic scanning panel generally has a maximum angular coverage of 120°).

The use of a mechanical positioner can make it possible to gradually achieve a 360° coverage, but this solution is not satisfactory because of the constraints of the mechanical positioner (mechanical inertia limiting the pointing agility). Furthermore, the realisation of Doppler modes covering all of the relative bearing domain in a time less than a second (sea clutter correlation time) proves very difficult to achieve because of the efforts imposed on the mechanics rotating at these scanning speeds.

There is therefore a need to provide a target characterisation method for a detection device of radar or sonar type, that allows for a greater freedom of mode design, and that makes it possible to develop Doppler modes with very low ambiguous frequency $F_a$, covering all of the relative bearing domain in a time that is potentially less than a second, and that observes all the directions quasi-simultaneously.

SUMMARY OF THE INVENTION

One subject of the invention is therefore a target characterisation method for a detection device of multi-panel radar or sonar type with electronic scanning, comprising the steps of:

- generating a plurality of pulses on a plurality of antenna panels of the detection device according to a temporal and angular interleaving pattern, so as to perform a scanning over all of the relative bearing domain of the detection device;
- generating a plurality of detection maps, by acquisition of a plurality of observations combined with one another by coherent or non-coherent integration of the echoes corresponding to the plurality of pulses, each detection map being obtained in a given direction corresponding to the width of the main lobe of the antenna panel;
- combining the detection maps so as to detect a presence of a target in the relative bearing domain of the detection device.

Advantageously, the interleaving pattern comprises a sequential transmission of the pulses of different transmission frequencies in a plurality of directions, each direction being associated with a set of transmission frequencies, the transmission frequencies being used cyclically in one and the same direction, the pulses being spaced apart by a repetition period that is predefined from one direction to another, the ambiguous period between two pulses of the same frequency in a same direction at the end of each scan over the relative bearing domain being greater than the repetition period.

As a variant, the interleaving pattern comprises a sequential transmission of the pulses of the same transmission frequency in a plurality of directions, the pulses of the same frequency being spaced apart by a predefined repetition period, the transmission frequency being modified at the end of each scan over the relative bearing domain, the ambiguous period between two transmissions of the same frequency in a same direction being greater than the repetition period.

As a variant, the interleaving pattern comprises a sequential transmission of pulses having different transmission frequencies in a same direction, the pulses being spaced apart by a predefined repetition period, the ambiguous period between two transmissions of the same frequency in a same direction, at the end of each scan over the relative bearing domain, being greater than the repetition period.

Advantageously, the repetition period and the ambiguous period are determined in such a way that:

$$\Delta_G \gg \theta_{3dB}$$

$$\text{with } \Delta G = \frac{G_{max} - G_{min}}{Nb_{pointings}} \text{ and } Nb_{pointings} = rnd\left(\frac{T_A}{T_R}\right)$$

in which $G_{max}-G_{min}$ corresponds to the relative bearing domain to be covered, and $\theta_{3dB}$ corresponds to the width of the main lobe.

Advantageously, a coherent integration is performed on the pulses of a same direction and of a same transmission frequency.

Advantageously, the interleaving pattern is repeated, by applying, on each repetition, an angular offset equal to the width of the main lobe.

Advantageously, the interleaving is spread out over three panels with phase control, the relative bearing domain to be covered being equal to 360°.

Advantageously, the pulses are generated over a number of transmission frequencies lying between two and six inclusive.

The invention relates also to a detection device of multi-panel radar or sonar type with electronic scanning, the detection device being configured to:

- generate a plurality of pulses on a plurality of antenna panels of the detection device according to a temporal and angular interleaving pattern, so as to perform a scan over all of the relative bearing domain of the detection device;
- generate a plurality of detection maps, by the acquisition of a plurality of observations combined with one another by coherent or non-coherent integration of the echoes corresponding to the plurality of pulses, each detection map being obtained in a given direction corresponding to the width of the main lobe of the antenna panel;
- combine the detection maps so as to detect a presence of a target in the relative bearing domain of the detection device.

DESCRIPTION OF THE FIGURES

Other features, details and advantages of the invention will emerge on reading the description given with reference to the attached drawings which are given by way of example.

The method according to the invention comprises a first step in which a plurality of pulses is generated on a plurality of antenna panels of the detection device, according to a temporal and angular interleaving pattern, so as to cover all of the relative bearing domain of the detection device. "All of the relative bearing domain" is understood to mean a complete scan, over the relative bearing domain to be covered.

The detection device advantageously comprises three panels, such that each panel has a coverage substantially equal to ±60°. The invention is however not limited to three panels, and other configurations can be envisaged, for example with four panels.

In a second step, several detection maps are generated. For that, the observations of the echoes corresponding to the pulses transmitted in the first step are integrated. The integration can be coherent (phase coherent between transmission and reception) or non-coherent. Each detection map is obtained in a given direction corresponding to the width of the main lobe of the antenna panel.

In the case where the integration is non-coherent, the detection map is a distance/recurrence map, and not a Doppler map (no Fourier transform). In the case where the integration is coherent, the detection map is a distance/frequency map (also called Doppler map in the state-of-the-art). In the present application, mention is made of detection maps, which includes the distance/recurrence maps and the distance/frequency maps.

The detection maps are then combined so as to detect a presence of a target in the relative bearing domain of the detection device. The combination of the detection maps, or post-integration processing, is well known to the person skilled in the art. The detection maps established for a same direction can be combined, for example, by summing the squared modulus of each detection map, or by any other function leading to the formation of a test statistic which maximises the probability of detection for a given false alarm rate.

Thus, the fact that a detection map is obtained quasi-simultaneously, in several directions, through the temporal and angular interleaving, makes it possible to design novel Doppler modes with a very low ambiguous frequency $F_a$, less than the pulse repetition frequency $F_r$.

The three steps are reiterated as many times as necessary depending on the mission entrusted to the detection device.

Figure 1:
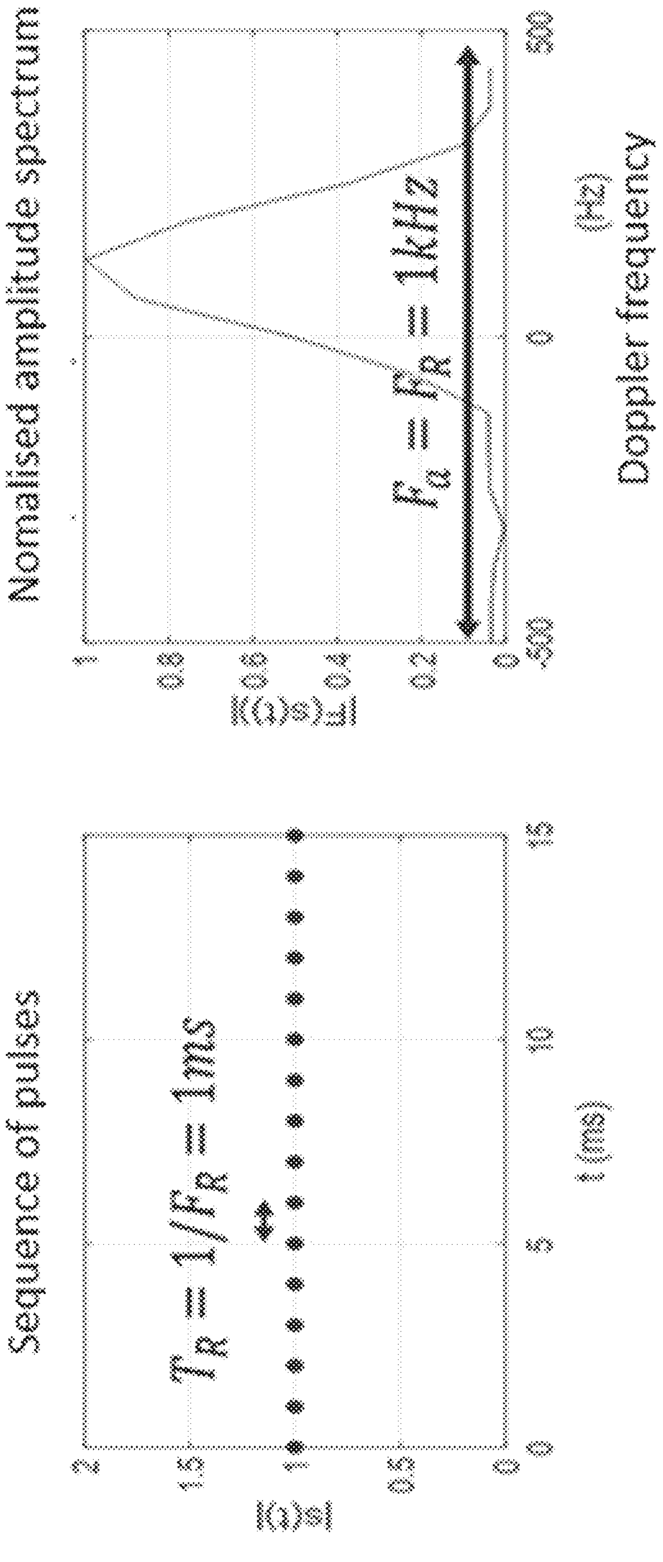
FIG. 1, already described, illustrates the link between waveform and frequency spectrum.
Figure 2:
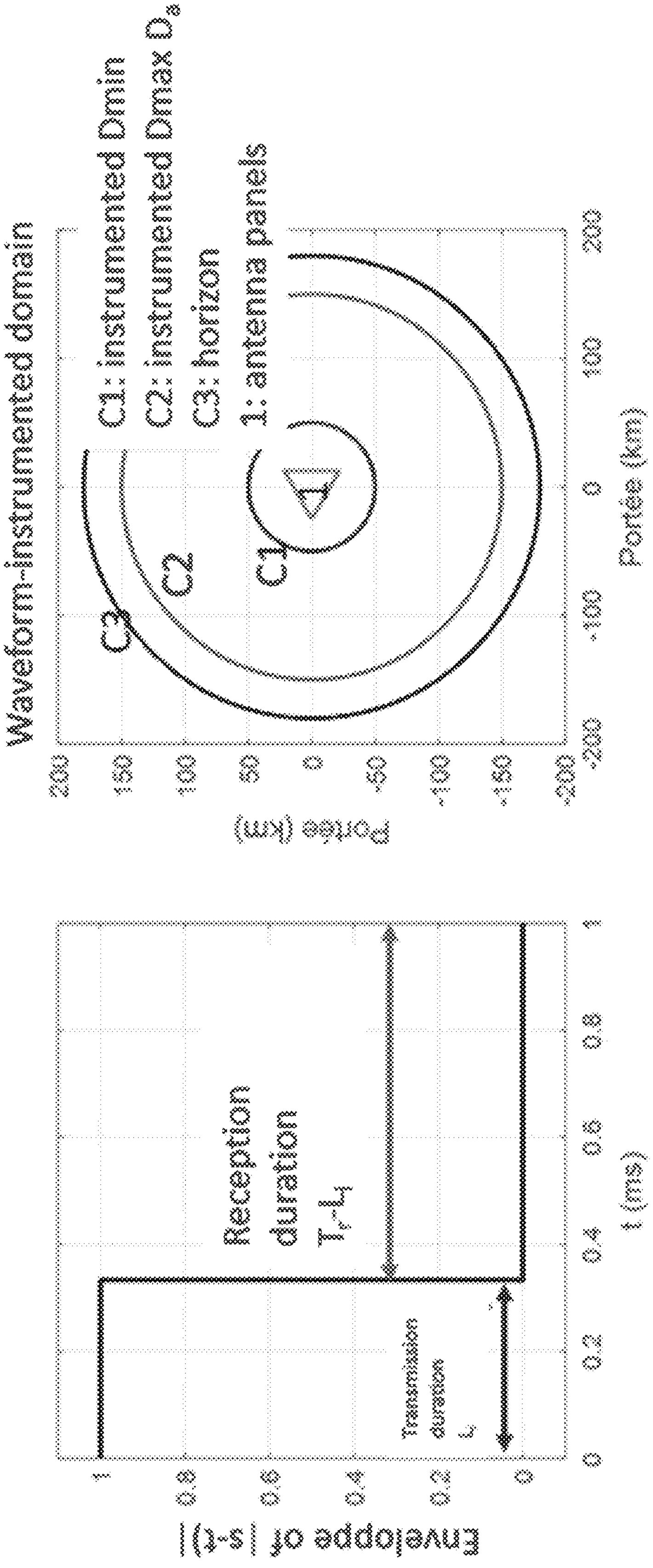
FIG. 2, already described, illustrates the link between waveform and instrumented domain.
Figure 3:
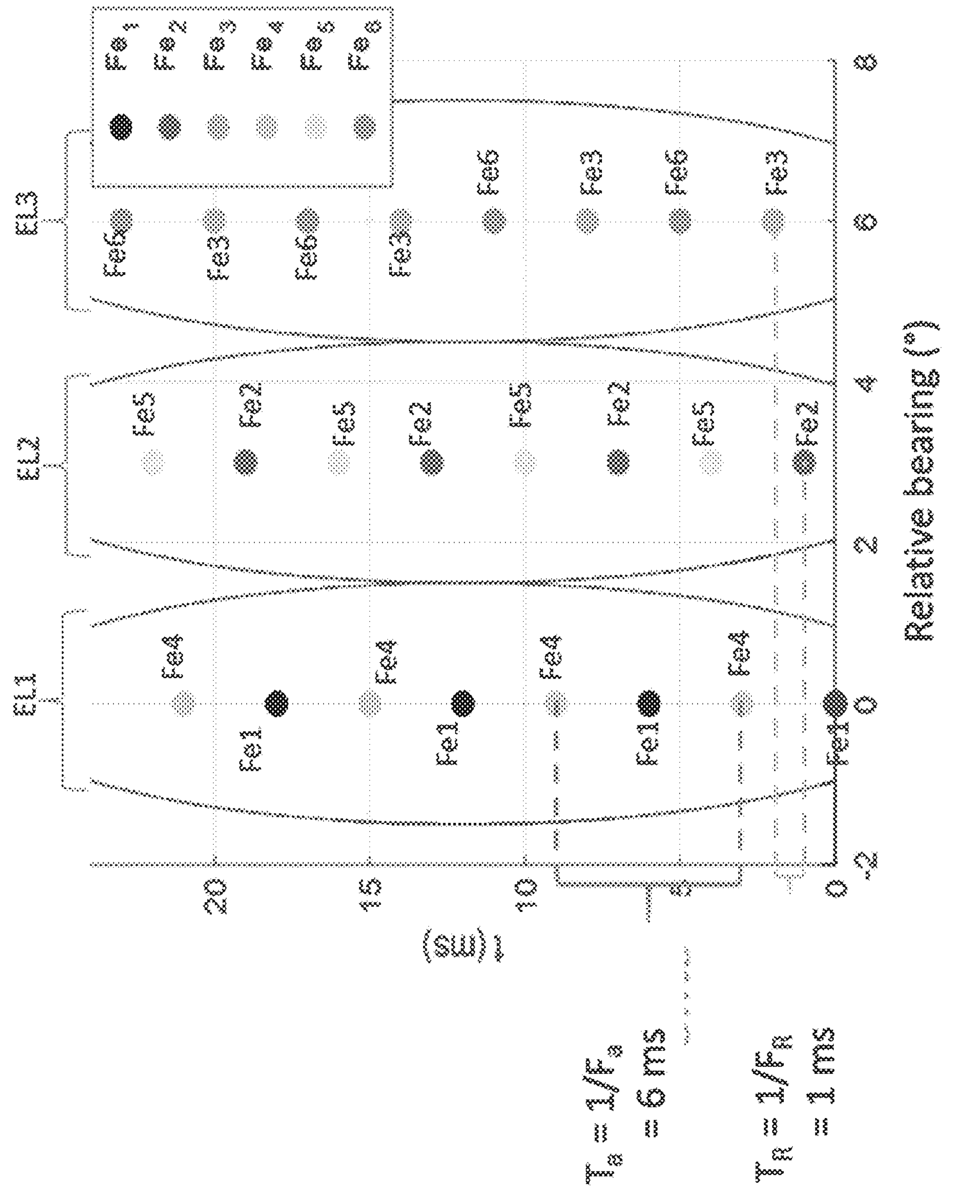
FIG. 3 illustrates an interleaving pattern according to a first embodiment.

A first embodiment of the invention is represented in FIG. 3.

According to this first embodiment, the interleaving pattern comprises a sequential transmission of the pulses of different transmission frequencies in a plurality of directions. The ellipses EL schematically represent the width of the main lobe of the radiation pattern of the transmitter panel, and therefore the pointing direction.

Each direction is associated with a set of transmission frequencies, the transmission frequencies being used cyclically, in the same direction. In FIG. 3, each set is composed of two transmission frequencies and forms a single pair of transmission frequencies (Fe1/Fe4 for the direction EL1, Fe2/Fe5 for the direction EL2, and Fe3/Fe6 for the direction EL3). The embodiment is not limited to a set of two different frequencies, and can be extended to a greater number of different transmission frequencies. Each dot corresponds to a transmitted pulse, with a transmission frequency from among Fe1, Fe2, Fe3, Fe4, Fe5 and Fe6. The ellipses EL1, EL2 and EL3 schematically represent the width of the main lobe of the radiation pattern of the transmitter panel. The pulses are spaced apart by a repetition period $T_R$ that is predefined from one direction to another. The ambiguous period Ta between two transmissions of the same frequency in a same direction at the end of each scan over the relative bearing domain is greater than the repetition period $T_R$.

The sequence represented in FIG. 3 comprises 24 successive pulses transmitted at the rate $F_R$. These pulses are interleaved angularly (regular change of pointing direction, here with a rate $F_R$ so as to observe all the directions quasi-simultaneously during the integration time) and temporally (change of pointing and/or of transmission frequency at a rate very much greater than the ambiguous frequency of the detection maps).

At the initial instant, a pulse at the frequency Fe1 is transmitted. After a period $T_R$, a pulse at the frequency Fe2 is transmitted with the same panel, the main lobe being electronically steered. After a new period $T_R$, a pulse at the frequency Fe3 is transmitted with the same panel, the main lobe being electronically steered, and so on. The ambiguous period corresponds to the delay between two pulses of the same frequency, in a same main antenna lobe (same direction).

In the context of the invention, it is not necessary for different frequencies to be transmitted. The act of transmitting the pulses on different frequencies is preferable because that makes it possible to obtain echoes from independent targets, which renders the post-processing more efficient. With a single transmission frequency, the target echoes, which would be weakly separated temporally, would be greatly correlated with one another, and little information could thus be extracted from the echoes by the post-processing operations.

The method according to the invention operates, optimally, with a number of transmission frequencies lying between 2 and 6.

Thus, the invention implements an angular, temporal, and generally frequency, interleaving.

Thus, the coherent integration (usually a Fourier transform) can be performed only on the pulses of a same direction and of a same transmission frequency.

It is recalled that the coherent integration is performed on a single transmission frequency, and the post-processing (post-integration) is performed on a plurality of transmission frequencies.

The spectrum thus obtained results from samples integrated at the rate $F_a=F_R/Nb_{Fe}$ (in which $Nb_{Fe}$ corresponds to the number of transmission frequencies), while transmitting the pulses at the rate $F_R$.

Thus, $T_a>T_R$, that is to say $F_a<F_R$.

In FIG. 3, $T_a$=6 ms and $T_R$=1 ms.

Figure 4:
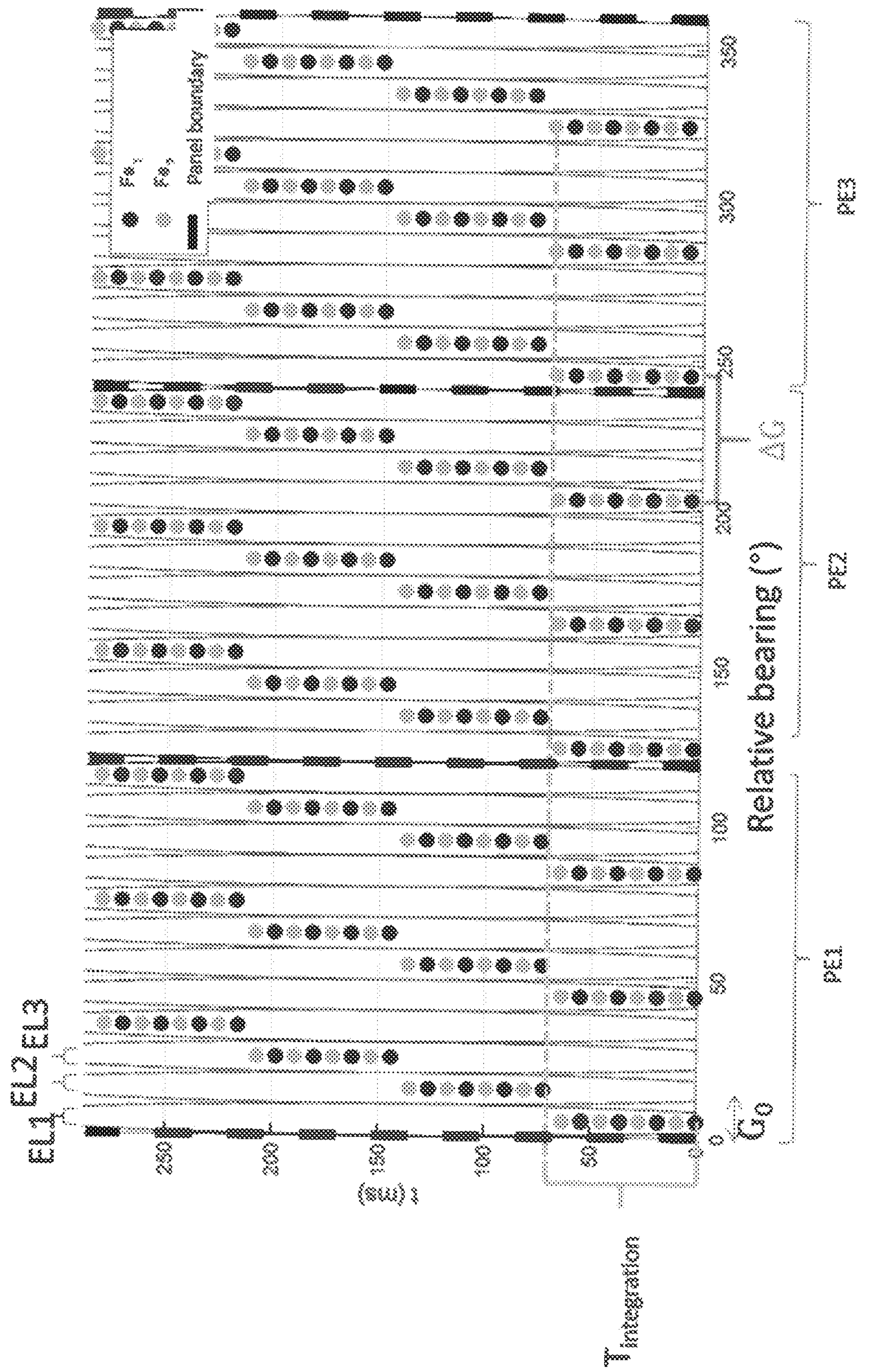
FIG. 4 illustrates an interleaving pattern according to a second embodiment, on several panels, so as to perform a complete scan.

FIG. 4 illustrates another embodiment, in which all of the relative bearing domain is covered, by using several panels. The different transmitter panels (PE1, PE2, PE3) are separated, in FIG. 4, by a dotted vertical line.

In FIG. 4, the pulses are generated with a first frequency Fe1, in different directions, and by using several panels, so as to scan all of the relative bearing domain. When the complete scan has been performed, the pulses are generated with at least one second frequency Fe2, in different directions, and by using several panels, so as to scan all of the relative bearing domain.

In FIG. 4, the angular interleaving covers 360°, and is spread for example over three panels with electronic scanning, each panel here covering a sector of 120° of relative bearing. During the integration time, all the directions are therefore observed quasi-simultaneously, without having to perform any look-back.

The successive pointings are spaced apart in relative bearing by $\Delta_G=360°/Nb_{pointings}$.

with $$\Delta G = \frac{G_{max} - G_{min}}{Nb_{pointings}} \text{ and } Nb_{pointings} = rnd\left(\frac{T_A}{T_R}\right)$$

in which $G_{max}-G_{min}$ corresponds to the relative bearing domain to be covered (360° or less), $\theta_{3dB}$ corresponds to the width of the main lobe (width commonly measured at −3 dB), and rnd( ) corresponds to the function which returns a rounding to the unit.

For example, to hold a setpoint ambiguous frequency $F_a$=55 Hz, with nine pointings over a complete antenna scan, the spacing between the successive pointings can be set at $\Delta_G$=40°.

When $\Delta_G >> \theta_{3dB}$, it is no longer necessary to separate the different successive pointings in frequency, which makes it possible to greatly reduce the number of transmission frequencies used. This embodiment advantageously makes it possible to use only two transmission frequencies Fe1 and Fe2, while, in the example of FIG. 3, six transmission frequencies are used.

The determination of $\Delta_G$, to be very much greater than $\theta_{3dB}$, depends notably on the antenna pattern, the objective being to be made insensitive to a potential echo of second recurrence which would be received through a side lobe of the antenna pattern. This parameterisation can be performed by the person skilled in the art using his or her general knowledge.

Advantageously, a coherent integration is performed on the pulses of a same direction and of a same transmission frequency. The integration is performed over an integration period $T_{integration}$ defined by the following relationship:

$$T_{integration} = Nb_{pointings} \cdot Nb_{fe} \cdot N_{Dop} \cdot T_R$$

$N_{Dop}$ corresponds to the number of pulses over which the Fourier transform is calculated.

In the example of FIG. 4, $T_{integration}$=72 ms.

At the end of an integration period $T_{integration}$, a set of detection maps is obtained that are of spectral width $F_a << F_R$, distributed over 360°, constructed quasi-simultaneously, and separated angularly by $\Delta G=360°/Nb_{pointings}$.

For $Nb_{Fe}$ independent detection maps in each pointing direction, these $Nb_{Fe}$ detection maps can be combined in order to characterise the targets in the coverage domain.

In order to fill the blind zones between two successive detection maps, the interleaving pattern, of time $T_{integration}$, is repeated, by applying, on each repetition, an angular offset $G_0$ equal or substantially equal to the width of the main lobe $\theta_{3dB}$. Thus, at the end of the complete interleaving pattern of FIG. 4, $Nb_{Fe}$ detection maps are obtained in each direction, with no observation holes, with a scan that is monotonic in relative bearing, that is to say with no look-back.

When designing the Doppler mode, it is possible to act on the duration of the observation holes of width $\Delta Hole \approx \Delta G - \theta_{3dB}$ to scan all of the relative bearing domain over a single time $T_{integration}$, while observing the setpoints linked to the repetition frequency $F_R$ and $F_a<F_R$.

Figure 5:
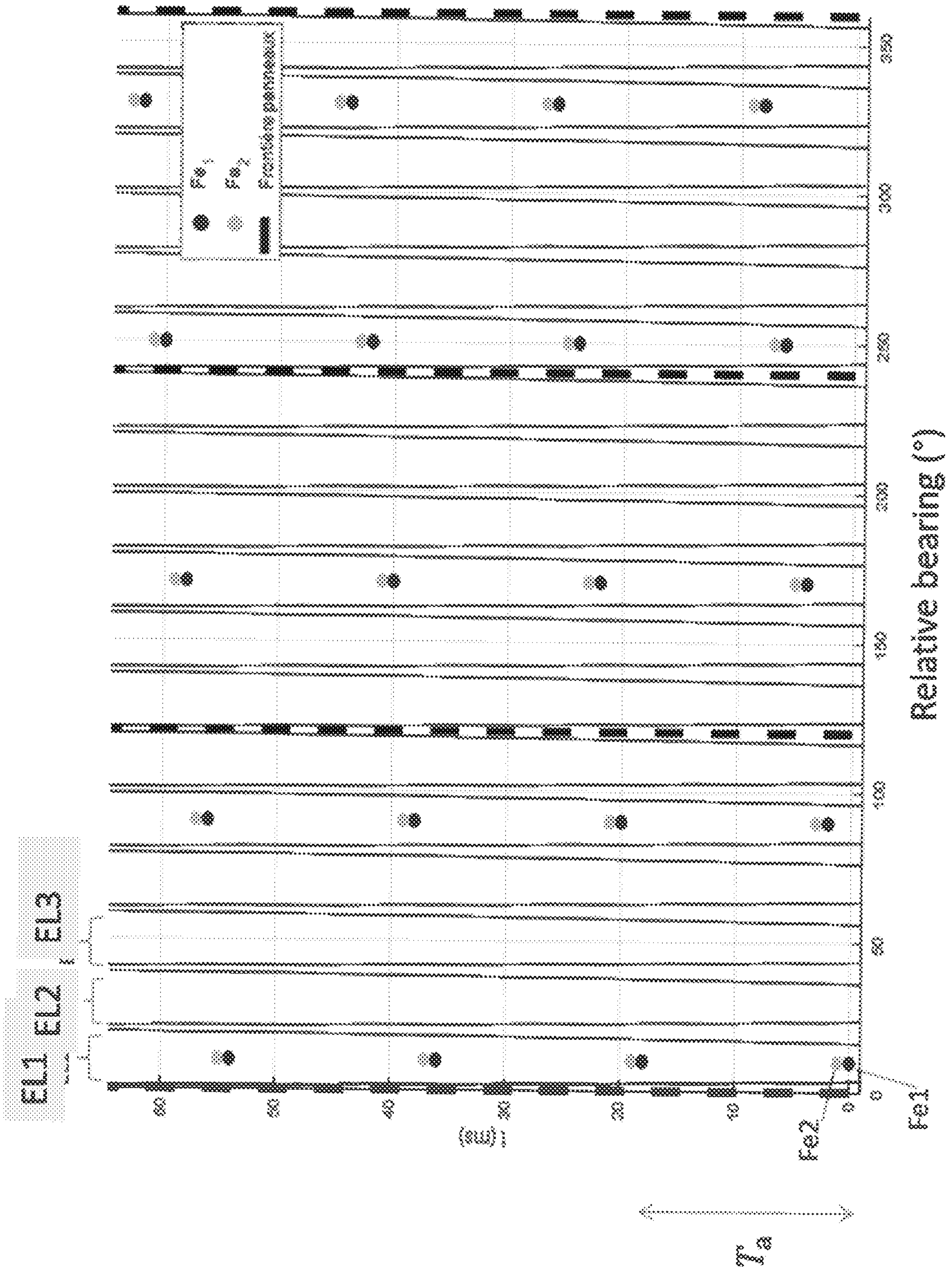
FIG. 5 illustrates an interleaving pattern according to a third embodiment.

According to another embodiment, illustrated by FIG. 5, the interleaving pattern comprises a sequential transmission of pulses having different transmission frequencies in a same direction (Fe1 and Fe2 in FIG. 5, which can be generalised to more than two transmission frequencies), then a scan so as to transmit the pulses having different transmission frequencies in another direction.

Thus, the embodiment illustrated by FIG. 5 provides for changing pointing direction once all the pulses on transmission frequencies have been transmitted, whereas, according to the first embodiment, the transmission frequency changes once all the pointings have been performed with the same frequency.

In the embodiment illustrated by FIG. 5, two successive pulses of different frequencies are spaced apart by a repetition period $T_R$, and the pulses of a same frequency, in a same direction defined by the main lobe of the panel, are spaced apart by an ambiguous period $T_a$. The pulses are transmitted in the same direction with the same transmission frequency after a complete scan of the relative bearing domain.

The embodiments illustrated by FIGS. 3 and 4 make it possible to well decorrelate the observations, and therefore to better average them in post-integration. Indeed, in considering a pointing direction, the delay between two pulses of different frequencies is higher in the embodiments illustrated by FIGS. 3 and 4 than in the embodiment illustrated by FIG. 5. Indeed, in the embodiment illustrated by FIG. 5, the detection maps are offset in frequency (transmission on Fe1 and Fe2), but are offset very little temporally. Now, when the observations are very close together temporally, the observations are greatly correlated and therefore carry very little information.

The method described according to one or other of the embodiments makes it possible to design a new class of Doppler modes with very low ambiguous frequency $F_a$, with a high recurrence frequency $F_R>F_a$, and exploiting the electronic scanning agility to very rapidly produce detection maps over all of the relative bearing domain (360°). Thus, the detection maps can be produced at the end of a delay $T_{integration}$ (approximately 100 ms) if an angular spacing of the detection maps equal to ΔHole is tolerated, or at the end of a delay $T_{integration} \cdot \Delta Hole/\theta_{3dB}$ (approximately 1 s) if the angular holes are eliminated.

An example of design of the Doppler mode illustrated by FIG. 4 is described hereinbelow.

The designer of the mode first defines:

An instrumented maximum distance $D_a \propto c_0/(2.F_R)$, with $c_0$ the speed of propagation of the transmitted pulse A spectral width of setpoint $F_a<F_R$ The number of pulses integrated $N_{Dop}$ to form each map DaVa (detection map or even Ambiguous Distance Ambiguous Speed map)

The refresh time $$T_{Raf} = Nb_{DaVa} \cdot \left(\frac{G_{max} - G_{min}}{\alpha \cdot \theta_G} \cdot \frac{N_{Dop}}{F_R}\right),$$

with $Nb_{Dava}$ the number of maps DaVa desired in each direction, for the purposes of post-integration or any other processing $G_{max}-G_{min}$ the relative bearing domain to be covered $\alpha>0$ a scalar setting the angular spacing between the different observation directions $\alpha\leq 1$: No blind directions $\alpha>1$: Blind directions tolerated so as to reduce $T_{Raf}$ Since these parameters are set, the secondary parameters can be obtained:

$$Nb_{Fe} = Nb_{DaVa}$$

$$Nb_{pointings} = rnd\left(\frac{F_R}{F_a}\right), \text{ with } rnd(\cdot) \text{ the rounded operator}$$

$$\Delta G = \frac{G_{max} - G_{min}}{Nb_{pointings}}$$

$$T_{integration} = N_{Dop}/F_a + ((Nb_{pointings} - 1)\cdot Nb_{Fe} + Nb_{Fe} - 1)/F_R$$

The elementary pattern of time $T_{integration}$ is repeated $$Nb_{pattern} = rnd\left(\frac{\Delta G}{\alpha\cdot\theta_{3dB}}\right)$$

times, by applying, on each repetition i, an angular offset $$G_0(i) = i\cdot\frac{\Delta G}{Nb_{pattern}},$$

so as to fill the blind directions.

The invention claimed is:

1. Target characterisation method for a detection device of multi-panel radar or sonar type with electronic scanning, comprising the steps of:

generating a plurality of pulses on a plurality of antenna panels of the detection device according to a temporal and angular interleaving pattern, so as to perform a scan over all of the relative bearing domain of the detection device;

generating a plurality of detection maps, by acquisition of a plurality of observations combined with one another by coherent or non-coherent integration of echoes corresponding to the plurality of pulses, each detection map being obtained in a given direction corresponding to the width of the main lobe of the antenna panel;

combining the detection maps so as to detect the presence of a target in the relative bearing domain of the detection device;

wherein the interleaving pattern comprises a sequential transmission of pulses having different transmission frequencies in a same direction, the plurality of pulses being spaced apart by a predefined repetition period, an ambiguous period between two transmissions of the same frequency in a same direction, at the end of each scan over the relative bearing domain, being greater than the repetition period.

2. Method according to claim 1, wherein the repetition period and the ambiguous period are determined in such a way that $$\Delta_G \gg \theta_{3dB}$$

$$\text{with } \Delta_G = \frac{G_{max} - G_{min}}{Nb_{pointings}} \quad \text{b\_pointings} = rnd\left(\frac{\text{T\_A}}{\text{T\_R}}\right)$$

in which $G_{max}-G_{min}$ corresponds to the relative bearing domain to be covered, and $\theta_{3dB}$ corresponds to the width of the main lobe.

3. Method according to claim 1, wherein a coherent integration is performed on pulses of a same direction and of a same transmission frequency.

4. Method according to claim 1, wherein the interleaving pattern is repeated, by applying, on each repetition, an angular offset equal to the width of the main lobe.

5. Method according to claim 1, wherein the interleaving is spread over three panels with phase control, the relative bearing domain to be covered being equal to 360°.

6. Method according to claim 1, wherein the plurality of pulses are generated on a number of transmission frequencies lying between two and six inclusive.

7. Detection device of multi-panel radar or sonar type with electronic scanning, the detection device being configured to:

generate a plurality of pulses on a plurality of antenna panels of the detection device according to a temporal and angular interleaving pattern, so as to perform a scan over all of the relative bearing domain of the detection device;

generate a plurality of detection maps, by acquisition of a plurality of observations combined with one another by coherent or non-coherent integration of echoes corresponding to the plurality of pulses, each detection map being obtained in a given direction corresponding to the width of the main lobe of the antenna panel;

combine the detection maps so as to detect the presence of a target in the relative bearing domain of the detection device;

wherein the interleaving pattern comprises a sequential transmission of pulses having different transmission frequencies in a same direction, the pulses being spaced apart by a predefined repetition period, the ambiguous period between two transmissions of the same frequency in a same direction, at the end of each scan over the relative bearing domain, being greater than the repetition period.

* * * * *